March 20, 1962  J. E. BEBINGER  3,026,050
FOOD WASTE DISPOSER
Filed Aug. 28, 1959  2 Sheets-Sheet 1

INVENTOR.
Jack E. Bebinger
BY
Andrew B. Hubbard
Atty.

March 20, 1962　　　J. E. BEBINGER　　　3,026,050
FOOD WASTE DISPOSER
Filed Aug. 28, 1959　　　　　　　　　　　　　　2 Sheets-Sheet 2
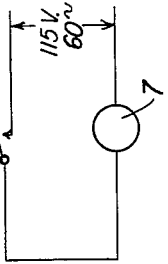
FIG. 7
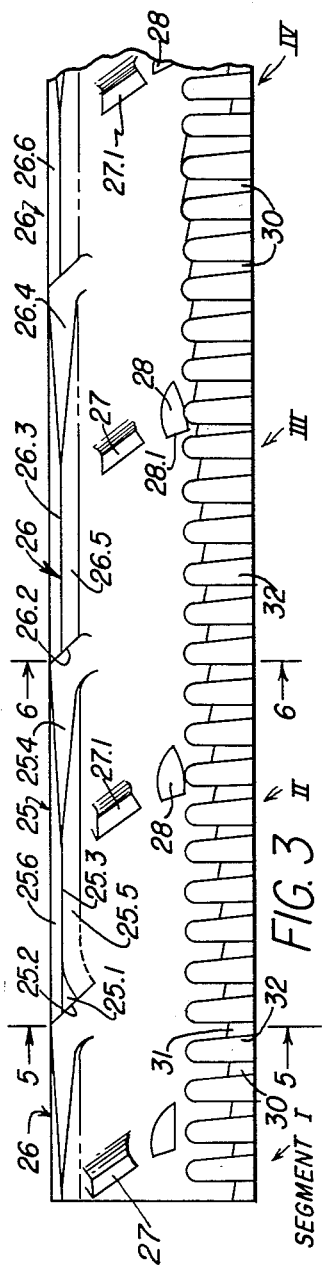
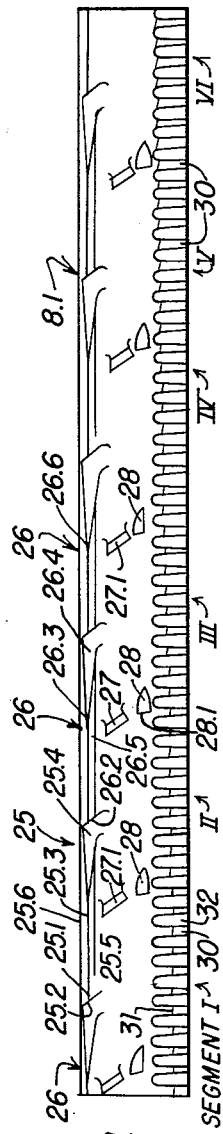
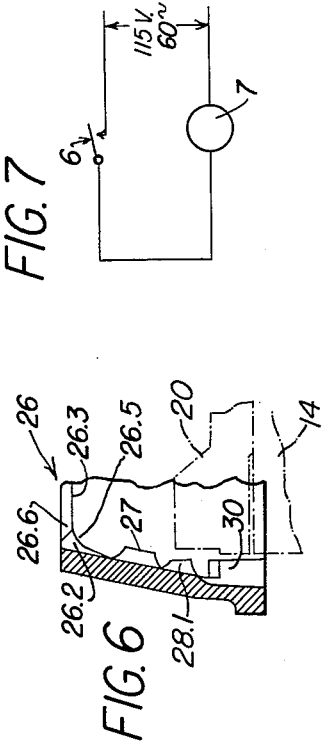
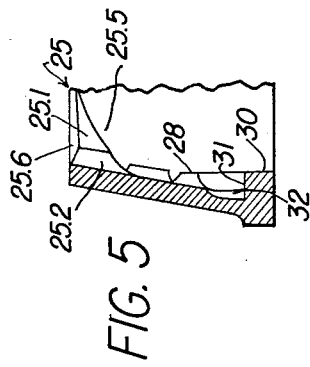
INVENTOR.
Jack E. Bebinger
BY
Andrew K. Hubbard
Atty.

_United States Patent Office_

3,026,050
Patented Mar. 20, 1962

3,026,050
FOOD WASTE DISPOSER
Jack E. Bebinger, Brookfield, Wis., assignor to General Electric Company, a corporation of New York
Filed Aug. 28, 1959, Ser. No. 836,670
6 Claims. (Cl. 241—46)

This invention relates to food waste disposal devices of the type in which food waste is reduced to small particle size in the presence of a continuous flow of cold water and the resulting slurry discharged to a plumbing drain. In particular, the invention relates to means for effecting the desired comminution of a charge of food waste with minimum running time of the machine and minimum use of water.

It is desirable that such devices rapidly dispose of a charge of food waste. Plumbing authorities desire to reduce the amount of water used for food waste disposer operation, and, of course, during the operation of a disposer, it is necessary to maintain a flow of cold water at a relatively high rate. It is unsatisfactory to obtain speed of waste disposal by arranging the apparatus to discharge relatively large waste particles, for in such a situation the likelihood of clogging the plumbing waste lines is present the public sewage facilities are unable properly to digest the waste. The desirability of combining fast comminution action while maintaining optimum performance as respects waste particle size, is particularly important in suburban and rural homes having septic tank facilities, for in such installations it is most desirable to grind the waste to as fine a fine state as practicable, while reducing the amount of water entering the septic system.

It is, therefore, a principal object of the present invention to provide a food waste disposer having a comminution system which will rapidly reduce food waste to small particle size.

It is another object of the invention to provide a food waste disposer having a shredding mechanism provided with primary comminuation elements arranged to drive the food waste downwardly against teeth which comprise secondary comminuation elements which complete the grinding of the waste.

It is a further object of the invention to provide a food waste disposer in which the comminution mechanism is subject to a minimum of jamming or stalling, whereupon it will perform with minimum servicing requirements.

In a presently preferred embodiment of the invention, the food waste disposer has at the base of a relatively conventional frusto-conical waste-receiving chamber, a shredding and comminuting assembly comprising a shredding ring and a rotating table or flywheel which operates on a vertical axis within the lower portion of the shredding ring. The shredding ring has two series of primary comminution elements, one series of which is disposed at the top of the ring and includes long cutting edges extending from heads which provide attack faces disposed at an acute angle from the vertical, and an intermediate series which comprise rigid abutments providing leading cutting edges or attack faces disposed at a somewhat similar angle. The shredding ring also includes a series of relatively closely spaced secondary comminution elements at the bottom of the ring. An important characteristic of the shredding ring resides in the fact that the secondary comminution elements include teeth which increase in height along a continuous gradual rise which is opposite to the direction of slope of the leading edges of the primary comminution elements. The teeth may be arranged as a single series in which the respective teeth rise between minimum and maximum height over the full circumference of the shredding ring, or they may be arranged in two or more groups in each of which the teeth increase in height as aforesaid. The secondary teeth are immediately in front of the rotating flywheel, there being only a small running clearance therebetween. Pursuant to this construction, the primary shredding or comminution elements cut, gouge, and abrade the larger pieces of waste and deflect them downwardly into the area in which the flywheel sweeps in front of the secondary elements. The opposing slope of the primary comminution elements relative to the line of height increase of the teeth is particularly effective in the comminution of waste matter, for the slope provides a series of successively narrowing wedge relationships between the effective comminution surfaces of the primary and the secondary elements.

The flywheel is provide with impeller means which maintain the movement of the waste matter and, in particular, sweep in front of the teeth to enforce the final reduction of the particle sizes of the waste material. Preferably, the impeller elements are in the form of hammers mounted for rotation about a vertical axis, whereupon centrifugal forces engendered by the rapid rotation of the flywheel establish the hammers in operative position while permitting them to yield rearwardly in the even that a large piece of waste becomes interposed between a hammer and the shredding ring, thus minimizing the possibility that the waste material will jam between the impellers and the shredding ring and stall the drive motor.

Other features and advantages of the invention will best be understood by the following detailed description of presently preferred embodiments thereof, read in connection with the accompanying drawings in which:

FIG. 3 is a developed view of one-half of the shredding ring;

FIG. 4 is a developed view of a second form of shredding ring;

FIG. 5 is a section of the shredder ring of FIG. 3 taken on lines 5—5 of FIG. 3;

FIG. 6 is a section of a shredding ring taken on lines 6—6 of FIG. 3; and

FIG. 7 is a schematic wiring diagram.

Figure 1:
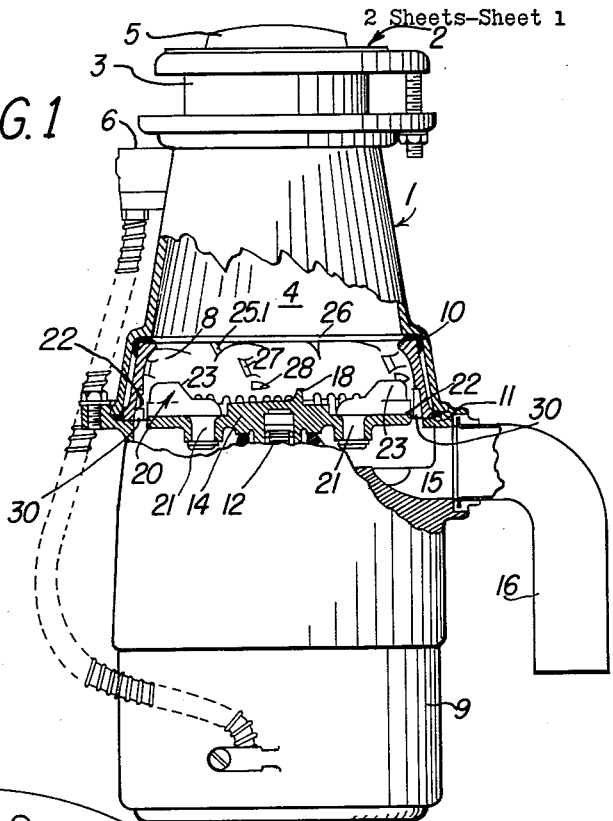
FIG. 1 is a side elevation of a food waste disposer embodying the present invention, with the central portion shown in section to illustrate one form of shredding ring and flywheel.

Referring now to FIG. 1, the food waste disposer 1 includes the conventional mounting flange assembly 2, by means of which the disposer is attached to a kitchen sink (not shown) or the like. As is well known in the art, the mounting flange includes a cup-like structure 3 which forms the entrance to the comminution chamber 4. A stopper within the cup-like structure is equipped with a handle 5 by means of which the stopper (not shown) may be manually removed from the structure 3 to permit the introduction of food waste into the chamber 4, and then returned to operating position in which it permits a flow of cold water to enter the comminution chamber during the comminution operation. As is well known in the art (see, for example, Swisher Patent 2,669,395, granted February 16, 1954), the user initiates operation of the disposer by manipulating the handle 5 to actuate a normally open switch 6 in series electrical circuit with a drive motor 7 housed in the base casing 9 of the disposer.

As shown in sectional elevation in FIG. 1, the lower part of the comminution chamber is defined by the substantially frusto-conical shredding ring 8, which, according to the present invention, comprises a cast ferrous alloy structure, heat treated to within the hardness range of Brinell 550–600, or Rockwell "C" 53–58. The shredding ring is resiliently but securely mounted within the comminution chamber by means such as the upper gasket 10 and lower gasket 11. The shaft 12 of the motor (not shown) housed within the base casing 9, is vertical and concentric with the shredder ring. A rotating table or flywheel 14 is securely affixed to the shaft 12 to be rotated thereby. The flywheel actually comprises the bottom of the comminution chamber and is in effect the top of the discharge chamber 15 which receives the slurry of finely ground waste and water and discharges it by way of the connection pipe 16 to the waste piping (not shown) of the building plumbing system.

The flywheel 14 is desirably a relatively heavy structure cast from nickel-iron alloy. Its primary function is to propel the waste material about the base of the comminution chamber to maintain the waste material against the shredding ring 8. Accordingly, the flywheel is provided with impeller elements such as the rigid lug 18 disposed near the center of the flywheel, and the hammer-like impellers 20 swingably mounted on the flywheel on the respective diametrically opposite pivots 21. The impellers 20 are shaped to have a projecting toe portion 22 and a heavy head 23. With the flywheel operating at motor speed which is of the order of 1725 r.p.m., the centrifugal forces swing the impellers 20 into an operating position established by walls (not shown) on the flywheel. In such operating position, the radially outermost surface of the toe 22 of each impeller 20 is preferably precisely above the vertical peripheral edge of the flywheel, as shown in FIG. 1. It is preferred to have the radially outermost surface of the toe portions have the same radius as the flywheel, so that in operating position, the toe portions in effect comprise a short vertical extension of the flywheel. Although the exact design of the impellers 20 is not a critical factor in the present invention, it may be of interest to know that the peripheral length of the toe 22 is of the order of one-quarter inch, whereas the peripheral length of the heavy body portion 23 is of the order of one inch.

Figure 2:
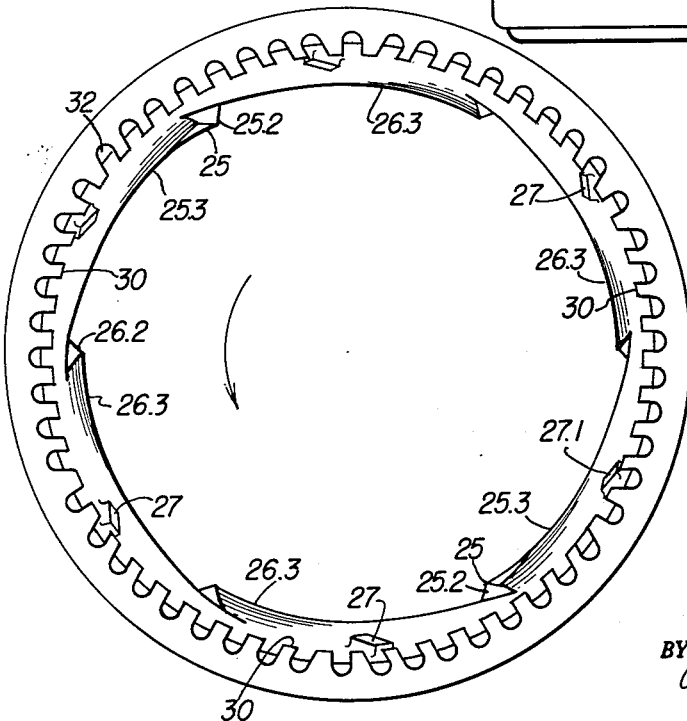
FIG. 2 is a bottom plan view of the shredding ring of FIG. 1.

The arrangement of primary and secondary comminution elements is best seen in FIGS. 2 and 3. For convenience, the shredder ring 8 has been divided into six segments, designated I through VI in FIG. 4, each of which contains upper and intermediate primary elements, and upper and lower secondary elements. The upper primary elements comprise the identical diametrically opposite structures 25 which are characterized by heavy head portions 25.1 having rather blunt, essentially trapezoidal attack faces 25.2, as best shown in FIG. 5, and a sharp trailing edge 25.3 which extends substantially parallel to the top of the shredding ring 8. The upper primary elements 26 have triangular attack faces 26.2, as shown in FIG. 6, and thus offer a sharper attack against the waste particles than do the faces 25.2 of the elements 25. The elements 26 also have the elongated sharp trailing edge 26.3. It will be noted from FIG. 2 that the respective trailing edges spiral outwardly in the direction of rotation of the flywheel; and as shown in FIG. 3, the respective primary elements 25 and 26 are "faired" or smoothed into the body of the shredder ring, as suggested by the portions 25.4 and 26.4. One primary element does not, therefore, interfere with the operation of the attack face portions of the next successive element. As is also indicated by FIG. 3, the attack faces are at an angle which is within the range of from 20 degrees to 50 degrees from the vertical; an effective angle of attack for the faces 25.2 and 26.2 is about 45 degrees. Finally, the lower surfaces of each of the primary elements, respectively 25.5 and 26.5, curve upwardly and inwardly and the upper surfaces thereof, respectively 25.6 and 26.6, slope inwardly and downwardly. The results of these design features are that heavy pieces of waste are smashed by the attack faces 25.2 of the elements 25 and are cut and gouged by the triangular attack faces 26.2 of elements 26. The sharp trailing edges of each of the primary elements continue the cutting action and tend to split the waste. The sloping attack faces of the upper primary elements and the curving under surfaces drive the waste matter downwardly toward the flywheel. On the other hand, the sloping upper surfaces 25.6 and 26.6 of the elements deflect some portions of the waste matter upwardly, with the result that there is fluid movement and turnover of the waste material which is very advantageous; for the waste is tumbled violently about and all surfaces thereof are eventually engaged by the attack faces and the cutting edges.

The intermediate primary shredding elements 27 are essentially rigid abutments having trapezoidal attack faces 27.1 which are radial to the shredding ring, as appears in FIGS. 2 and 6. The attack faces 27.1 are within the same angular range as the faces 25.2 and 26.2 of the primary elements 25 and 26, but are preferably at a slightly more acute angle relative to the vertical. For example, where the faces 25.2 and 26.2 are at an angle of 45 degrees, the faces 27.1 are at an angle of 35 degrees. It will be noted that intermediate primary elements 27 commence just below the base of the upper primary elements; and that whereas the leading faces of the upper elements are at about the mid-point of the respective segments of the shredding ring, the leading faces of the intermediate elements are at the ends of the segments. Waste material deflected downwardly by the leading faces and the curving under bodies of the upper primary elements inevitably come into engagement with the leading faces of the intermediate elements 27, whereupon the waste is further abraded and deflected toward the flywheel.

The shredder ring 8 is further provided with upper secondary shredder elements 28 which are relatively shallow projections, the faces of which are vertical rather than following the slope of the shredder ring wall, as do the intermediate primary elements. As indicated in FIG. 6, the radially innermost surface of the elements 28 is in the vertical plane of the lower primary teeth 30; and as shown in FIG. 3, the slope of the leading face 28.1 of the respective elements 28 is at an even more acute angle relative to the vertical. Preferably, such slope is at the low end of the range of attack angle of the several shredding elements, and a satisfactory angle for the attack faces of the elements 28 is 20 degrees from the vertical.

The lower secondary shredder elements 30 may properly be called "teeth," for they comprise edged structures which project inwardly from the lower wall of the ring 8 and are in close running-clearance relation with the periphery of the flywheel. Preferably, said clearance is not greater than 0.010 inch. In the shredding ring embodiment of FIG. 3, the teeth 30 are in two series, each comprehending one hundred eighty degrees of the shredder ring. The teeth increase in height along a uniformly rising line, pursuant to which the top edge 31 of the first tooth in the series is at or slightly below the flywheel rim, and the top edge of the last tooth of the series is substantially above the flywheel rim, but, nevertheless, below the maximum height of the hammers 20, as clearly appears from FIG. 1. It will be seen in FIGS. 3 and 4 that the top edge of each tooth slopes slightly downwardly in the direction of rotation of the flywheel; that is to say, the direction of movement of the waste matter during the comminution operation. On the other hand, the leading edge of each tooth inclines slightly in a direction facing the movement of the waste matter. For example, the angle of inclination may be 5 degrees from the vertical. The grooves 32 formed in the wall of the shredder ring between adjacent teeth 30 provide axial passages communicating between the respective comminution and discharge chambers. As appears in FIG. 4, each of the grooves 32 commences above the immediately preceding tooth 30.

An advantageous relationship is established between the secondary teeth 30 and the intermediate primary elements 27, whereby the waste food is urged into more and more constricted areas between the intermediate primary elements and the secondary teeth. As shown in FIG. 3, the axial length of the intermediate elements 27 is equal, but the bottom edge of each successive element is closer to the bottom of the shredding ring. At segment III, for example, the bottom of the element 27 is one-sixteenth of an inch closer to the base of the shredding ring than is the bottom of the element 27 in segment I. At the commencement of segment I, the secondary tooth 30 is five-thirty-seconds inches in height, leaving a space of three-quarters of an inch between the top of the secondary tooth and the bottom of the element 27. At segment III, because of the increase in height of the tooth immediately below the element 27, the spacing therebetween has decreased to slightly more than three-eighths inches. In both the FIG. 3 and FIG. 4 embodiments, the bottom of the successive elements 27 approach the base of the shredder ring at a uniform rate, pursuant to which in each of the shredder ring embodiments, the last of the elements 27 is spaced three-quarters of an inch above the base of the ring. Whereas the shredder ring teeth 30 are in two series in the embodiment of FIG. 3 and each series increases uniformly in height in the traversal of the three segments of the shredder ring occupied thereby, the teeth 30 in the shredder ring 8.1 of FIG. 4 are arranged in a single series in which the increase in height is attained within the full circumference of the shredding ring.

The operative effect of the above described disposition of the elements is to direct the food waste always in a downward direction against the secondary shredding elements. The primary elements are particularly effective quickly to break up the larger masses; they shatter and gouge the waste matter and the reduced matter is driven into the narrowing space between the elements 27 and the teeth 30, in which space the waste matter is sheared against the leading edges of the teeth 30 and the reduced waste moved downwardly because of the slope of the leading edges of the teeth through the passages provided by the channels 32. It will be remembered that the comminution of the waste matter is carried out in the presence of a flow of water which continuously lubricates the mass of waste and by centrifugal action completes the flushing of the slurry of waste and water through the passages 32 and into and through the discharge chamber.

Whereas in previous food waste disposer constructions not utilizing the opposing angular slope of primary and secondary shredding elements, it was possible for food waste to adjust itself in the comminution chamber so that after an initial gouge was made in the waste particle, said particle continued to traverse the comminution chamber without further reduction in size until eventually some other waste material jarred it loose for further attack by the comminution elements, the opposing angular relationship of the present shredding elements makes it impossible for such a situation to arise, with increase in the speed with which the waste matter is reduced to the desired small particle.

While there has been described what is at present considered to be the preferred embodiment of the invention, it will be understood that various modifications may be made therein, and it is intended to cover in the appended claims all such modifications as fall within the scope of the invention.

I claim:

1. In a food waste disposal machine having structure providing a comminution chamber for food waste and a discharge chamber for connection to a plumbing waste line, the improvement which comprises a flywheel disposed intermediate said chambers, means mounting said flywheel for rotation about a vertical axis, shredding means in fixed position within the lower part of the comminution chamber and including primary comminution elements having at least one face inclined downwardly in a predetermined operating direction of rotation of said flywheel for feeding waste downwardly and at least one series of upstanding teeth in close running clearance relation with the periphery of said flywheel, the upper ends of said teeth of the corresponding series being disposed along a line sloping upwardly in said operating direction of rotation of the flywheel and there being grooves between said teeth for waste to pass from said comminution chamber into said discharge chamber, impeller means on said flywheel for moving waste in said chamber against said comminution elements and said teeth during said rotation of the flywheel and having a head portion lower than said primary comminution elements and higher than the highest upper end of said teeth, said head portion being disposed to travel a horizontal path directly opposite the innermost sides of said teeth in close proximity thereto, during said rotation of said flywheel, for moving waste in said comminution chamber against said teeth, and means for rotating said flywheel.

2. The improvement in a food waste disposal machine according to claim 1, further characterized by certain of the primary comminution elements thereof having elongated body portions of triangular cross section, the apex of said cross section facing inwardly of the comminution chamber and providing an edge extending parallel to the plane of rotation of the flywheel.

3. The improvement in a food waste disposal machine according to claim 1, further characterized by the primary comminution elements thereof having attack faces disposed at a plurality of levels, the inclination of said attack faces relative to the axis of rotation of said flywheel becoming more acute as the levels of said attack faces approach the flywheel.

4. The improvement in a food waste disposal machine according to claim 1, further characterized by the teeth thereof, having leading edges inclining in a direction opposite to the direction of rotation of the flywheel.

5. In a food waste disposal machine having structure providing an upstanding comminution chamber for food waste and a discharge chamber for connection to a plumbing waste line, the improvement which comprises a flywheel disposed intermediate said chambers, means mounting said flywheel for rotation about a vertical axis, a shredding ring coaxial with said flywheel and disposed in a fixed position within the lower portion of said comminution chamber, said shredding ring having an upper and an intermediate series of primary comminution elements projecting from the inner wall thereof, the upper of said series being in a substantially horizontal plane adjacent the top of the shredding ring and the other series being at a level intermediate the first series and said flywheel, each of said series comprising structures having attack faces inclined downwardly in a predetermined operating direction of rotation of said flywheel for deflecting waste downwardly toward said flywheel, the inclination of the attack faces of the upper series being more acute, relative to the plane of the flywheel, than the inclination of the attack faces of the other series, a plurality of secondary comminution elements including a plurality of vertically extending teeth projecting radially inwardly from the lower portion of said shredding ring into close running clearance with said flywheel, the bottom of said teeth being in a common horizontal plane and the upper ends of at least one series of said teeth being disposed along a line sloping upwardly in the direction of rotation of said flywheel, the wall of said shredding ring being formed with an upstanding drainage groove between adjacent teeth for communication between said comminution and discharge chambers, said drainage grooves being of uniform height and coextensive with the longest tooth of said series of teeth, impeller means on said flywheel for moving waste in said chamber against said comminution elements and said teeth during rotation of said flywheel, said impeller means having a head portion lower than said lower series of comminution elements and higher than the highest end of said teeth, said head portion being disposed to travel in a horizontal path directly opposite the radially innermost sides of said teeth in close proximity thereto during rotation of said flywheel for moving waste against said teeth, and means for rotating said flywheel.

6. The improvement in food waste disposal machines according to claim 5, further characterized by said impeller means being pivotally mounted on said flywheel for swinging movement in a horizontal plane.

References Cited in the file of this patent

UNITED STATES PATENTS

| | | | |
|---|---|---|---|
| 2,322,058 | Powers | June 18, | 1943 |
| 2,565,322 | Powers | Aug. 21, | 1951 |
| 2,579,400 | Schindler | Dec. 18, | 1951 |
| 2,719,011 | Bebinger | Sept. 25, | 1955 |
| 2,730,308 | Jordan | Jan. 10, | 1956 |
| 2,760,730 | Jordan | Aug. 28, | 1956 |
| 2,848,172 | Ewing | Aug. 19, | 1958 |
| 2,939,639 | Coss | June 7, | 1960 |